(12) United States Patent
Naveh et al.

(10) Patent No.: US 8,996,895 B2
(45) Date of Patent: *Mar. 31, 2015

(54) METHOD, APPARATUS, AND SYSTEM FOR ENERGY EFFICIENCY AND ENERGY CONSERVATION INCLUDING OPTIMIZING C-STATE SELECTION UNDER VARIABLE WAKEUP RATES

(71) Applicant: Intel Corporation, Santa Clara, CA (US)

(72) Inventors: Alon Naveh, Ramat Hasharon (IL); Eliezer Weissmann, Haifa (IL); Ofer Nathan, Kiryat Yam (IL); Nadav Shulman, Tel Mond (IL)

(73) Assignee: Intel Corporation, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/317,239

(22) Filed: Jun. 27, 2014

(65) Prior Publication Data

US 2014/0317430 A1 Oct. 23, 2014

Related U.S. Application Data

(63) Continuation of application No. 13/339,284, filed on Dec. 28, 2011, now Pat. No. 8,799,687.

(51) Int. Cl.
*G06F 1/00* (2006.01)
*G06F 1/32* (2006.01)
(Continued)

(52) U.S. Cl.
CPC ............ *G06F 1/3275* (2013.01); *G06F 1/3206* (2013.01)
USPC ............. 713/300; 713/320; 710/260; 712/28; 712/32

(58) Field of Classification Search
CPC ................................ G06F 1/3275; G06F 1/3206

USPC ............... 713/300, 320; 710/260; 712/28, 32
See application file for complete search history.

(56) References Cited

U.S. PATENT DOCUMENTS 5,163,153 A 11/1992 Cole et al.
5,428,790 A * 6/1995 Harper et al. .................. 713/322
(Continued)

FOREIGN PATENT DOCUMENTS

EP 1 282 030 A1 5/2003

OTHER PUBLICATIONS

International Searching Authority, "Notification of Transmittal of the International Search Report and the Written Opinion of the International Searching Authority," mailed Jun. 2, 2013, in International application No. PCT/US2012/071776.
(Continued)

*Primary Examiner* — Stefan Stoynov
(74) *Attorney, Agent, or Firm* — Trop, Pruner & Hu, P.C.

(57) ABSTRACT

A processor may include power management techniques to, dynamically, chose an optimal C-state for the processing core. The measurement of real workloads on the OSes exhibit two important observations (1) the bursts of high interrupt rate are interspersed between the low interrupt rate periods and long periods of high activity levels; and (2) the interrupt rate may, suddenly, fall below an interrupt rate (of 1 millisecond, for example) that is typical of the current operating systems (OS). Instead of determining the C-state based on the stale data stored in the counters, the power control logic may determine an optimal C-state by overriding the C-state determined by the OS or any other power monitoring logic. The power control logic may, dynamically, determine an optimal C-state based on the CPU idle residency times and variable rate wakeup events to match the expected wakeup event rate.

20 Claims, 5 Drawing Sheets (51) Int. Cl.
*G06F 13/24* (2006.01)
*G06F 15/00* (2006.01)

(56) References Cited

U.S. PATENT DOCUMENTS

| | | | |
|---|---|---|---|
| 5,522,087 | A | 5/1996 | Hsiang |
| 5,590,341 | A | 12/1996 | Matter |
| 5,621,250 | A | 4/1997 | Kim |
| 5,926,640 | A | 7/1999 | Mason et al. |
| 5,931,950 | A | 8/1999 | Hsu |
| 6,411,157 | B1 | 6/2002 | Hsu et al. |
| 6,748,546 | B1 | 6/2004 | Mirov et al. |
| 6,792,392 | B1 | 9/2004 | Knight |
| 6,823,516 | B1 | 11/2004 | Cooper |
| 6,829,713 | B2 | 12/2004 | Cooper et al. |
| 6,996,728 | B2 | 2/2006 | Singh |
| 7,010,708 | B2 | 3/2006 | Ma |
| 7,043,649 | B2 | 5/2006 | Terrell |
| 7,093,147 | B2 | 8/2006 | Farkas et al. |
| 7,103,786 | B2 | 9/2006 | Chen |
| 7,111,179 | B1 | 9/2006 | Girson et al. |
| 7,194,643 | B2 | 3/2007 | Gonzalez et al. |
| 7,272,730 | B1 | 9/2007 | Acquaviva et al. |
| 7,401,240 | B2 | 7/2008 | Heller |
| 7,412,615 | B2 | 8/2008 | Yokota et al. |
| 7,434,073 | B2 | 10/2008 | Magklis |
| 7,437,270 | B2 | 10/2008 | Song et al. |
| 7,454,632 | B2 | 11/2008 | Kardach et al. |
| 7,529,956 | B2 | 5/2009 | Stufflebeam |
| 7,539,885 | B2 | 5/2009 | Ma |
| 7,711,966 | B2 * | 5/2010 | Prabhakaran et al. ........ 713/300 |
| 7,730,340 | B2 | 6/2010 | Hu et al. |
| 7,953,032 | B2 | 5/2011 | Liang |
| 8,112,647 | B2 | 2/2012 | Branover et al. |
| 8,291,249 | B2 | 10/2012 | Branover et al. |
| 8,499,181 | B2 | 7/2013 | Odaohhara |
| 2001/0044909 | A1 | 11/2001 | Oh et al. |
| 2002/0194509 | A1 | 12/2002 | Plante et al. |
| 2003/0061383 | A1 | 3/2003 | Zilka |
| 2004/0025067 | A1 | 2/2004 | Gary |
| 2004/0064752 | A1 | 4/2004 | Kazachinsky et al. |
| 2004/0098560 | A1 | 5/2004 | Storvik et al. |
| 2004/0139356 | A1 | 7/2004 | Ma |
| 2004/0268166 | A1 | 12/2004 | Farkas et al. |
| 2005/0022038 | A1 | 1/2005 | Kaushik et al. |
| 2005/0033881 | A1 | 2/2005 | Yao |
| 2005/0132238 | A1 | 6/2005 | Nanja |
| 2006/0050670 | A1 | 3/2006 | Hillyard et al. |
| 2006/0053326 | A1 | 3/2006 | Naveh |
| 2006/0059286 | A1 | 3/2006 | Bertone et al. |
| 2006/0069936 | A1 | 3/2006 | Lint et al. |
| 2006/0117202 | A1 | 6/2006 | Magklis et al. |
| 2006/0184287 | A1 | 8/2006 | Belady et al. |
| 2007/0005995 | A1 | 1/2007 | Kardach et al. |
| 2007/0016817 | A1 | 1/2007 | Albonesi et al. |
| 2007/0079294 | A1 | 4/2007 | Knight |
| 2007/0106827 | A1 | 5/2007 | Boatright et al. |
| 2007/0156992 | A1 | 7/2007 | Jahagirdar |
| 2007/0214342 | A1 | 9/2007 | Newburn |
| 2007/0239398 | A1 | 10/2007 | Song et al. |
| 2007/0245163 | A1 | 10/2007 | Lu et al. |
| 2008/0028240 | A1 | 1/2008 | Arai et al. |
| 2008/0250260 | A1 | 10/2008 | Tomita |
| 2009/0006871 | A1 | 1/2009 | Liu et al. |
| 2009/0150695 | A1 | 6/2009 | Song et al. |
| 2009/0150696 | A1 | 6/2009 | Song et al. |
| 2009/0158061 | A1 | 6/2009 | Schmitz et al. |
| 2009/0158067 | A1 | 6/2009 | Bodas et al. |
| 2009/0172375 | A1 | 7/2009 | Rotem et al. |
| 2009/0172428 | A1 | 7/2009 | Lee |
| 2009/0235105 | A1 | 9/2009 | Branover et al. |
| 2010/0115309 | A1 | 5/2010 | Carvalho et al. |
| 2010/0146513 | A1 | 6/2010 | Song |
| 2010/0191997 | A1 | 7/2010 | Dodeja et al. |
| 2011/0078477 | A1 | 3/2011 | Park |
| 2011/0154090 | A1 | 6/2011 | Dixon et al. |

OTHER PUBLICATIONS

U.S. Appl. No. 12/889,121, "Providing Per Core Voltage and Frequency Control," filed Sep. 23, 2010, by Pakaj Kumar, 27 pages.

SPEC-Power and Performance, Design Overview V1.10, Standard Performance Information Corp., Oct. 21, 2008, 6 pages.

U.S. Appl. No. 13/070,700, "Obtaining Power Profile Information With Low Overhead," filed Mar. 24, 2011, by Robert Knight, 29 pages.

Anoop Iyer, et al., "Power and Performance Evaluation of Globally Asynchronous Locally Synchronous Processors," 2002, pp. 1-11.

Greg Semeraro, et al., "Hiding Synchronization Delays in a GALS Processor Microarchitecture," 2004, pp. 1-13.

Joan-Manuel Parcerisa, et al., "Efficient Interconnects for Clustered Microarchitectures," 2002, pp. 1-10.

Grigorios Magklis, et al., "Profile-Based Dynamic Voltage and Frequency Scalling for a Multiple Clock Domain Microprocessor," 2003, pp. 1-12.

Greg Semeraro, et al., "Dynamic Frequency and Voltage Control for a Multiple Clock Domain Architecture," 2002, pp. 1-12.

Greg Semeraro, "Energy-Efficient Processor Design Using Multiple Clock Domains with Dynamic Voltage and Frequency Scaling," 2002, pp. 29-40.

Diana Marculescu, "Application Adaptive Energy Efficient Clustered Architectures," 2004, pp. 344-349.

L. Benini, et al., "System-Level Dynamic Power Management," 1999, pp. 23-31.

Ravindra Jejurikar, et al., "Leakage Aware Dynamic Voltage Scaling for Real-Time Embedded Systems," 2004, pp. 275-280.

Ravindra Jejurikar, et al., "Dynamic Slack Reclamation With Procrastination Scheduling in Real-Time Embedded Systems," 2005, pp. 111-116.

R. Todling, et al., "Some Strategies for Kalman Filtering and Smoothing," 1996, pp. 1-21.

R.E. Kalman, "A New Approach to Linear Filtering and Prediction Problems," 1960, pp. 1-12.

Intel Technology Journal, "Power and Thermal Management in the Intel Core Duo Processor," May 15, 2006, pp. 109-122.

Intel Developer Forum, IDF2010, Opher Kahn, et al., "Intel Next Generation Microarchitecture Codename Sandy Bridge: New Processor Innovations," Sep. 13, 2010, 58 pages.

Taiwan Patent Office, Office Action mailed Nov. 7, 2014, in Taiwanese application No. 101151080. (Redacted).

* cited by examiner

METHOD, APPARATUS, AND SYSTEM FOR ENERGY EFFICIENCY AND ENERGY CONSERVATION INCLUDING OPTIMIZING C-STATE SELECTION UNDER VARIABLE WAKEUP RATES

CROSS-REFERENCE TO RELATED APPLICATION

This application is a continuation of U.S. patent application Ser. No. 13/339,284, filed Dec. 28, 2011, now U.S. Pat. No. 8,799,687, the content of which is hereby incorporated by reference.

FIELD

This disclosure pertains to energy efficiency and energy conservation in integrated circuits, as well as code to execute thereon, and in particular but not exclusively, to optimize C-State selection under variable wakeup rates.

BACKGROUND

Advances in semi-conductor processing and logic design have permitted an increase in the amount of logic that may be present on integrated circuit devices. As a result, computer system configurations have evolved from a single or multiple integrated circuits in a system to multiple hardware threads, multiple cores, multiple devices, and/or complete systems on individual integrated circuits. Additionally, as the density of integrated circuits has grown, the power requirements for computing systems (from embedded systems to servers) have also escalated. Furthermore, software inefficiencies, and its requirements of hardware, have also caused an increase in computing device energy consumption. In fact, some studies indicate that computers consume approximately 13% of the entire electricity supply for the United States of America. As a result, there is a vital need for energy efficiency and conservation associated with integrated circuits. And as servers, desktop computers, notebooks, ultra-books, tablets, mobile phones, processors, embedded systems, etc. become even more prevalent (from inclusion in the typical computer, automobiles, and televisions to biotechnology), the effect of computing device sales stretches well outside the realm of energy consumption into a substantial, direct effect on The United States economy, as computing device related sales already have a large causal relationship with The United States Gross Domestic Product. Though specific statistics relevant to the United States of America have been presented here, the need for enhancing energy efficiencies and reducing energy or power consumption are applicable throughout the world.

For example, a computer system may comprise a processor, which may include a core area and an uncore area. The core area may include one or more processing cores, caches (L1 and L2, for example), line-fill buffers and the uncore area may comprise last level caches, a memory controller, and such other blocks. The processor power management techniques aim at reducing the power consumed by the core area by changing the power state (such as C0, C1, C2, C3, C4, C6) of the cores within the processor based on some criteria such as activity time or sleep time of the processor.

However, deeper power saving states (C-states) such as C6 may be associated with a high energy cost for the transitions and such costs may become more significant as residency times of C-states shrink due to high interrupt rates of real-time needs or due to the high interrupt rates caused by I/O traffic. Incorrect C-state usage will result in battery life loss instead of gain. Furthermore, incorrect selection of the power saving state may increase the interrupt response time, which may affect the performance. The selection of a power saving state (or C-state) is therefore a balance between the energy savings associated with the power state and the performance loss due to the exit latency. Also, entering a deeper sleep state may not be energy conserving (or cost saving) activity if the residency time in that deeper sleep state is not long enough to justify the entry into the deeper sleep state. Such an attempt to enter into the deeper sleep state may be therefore inefficient. The current approaches such as ACPI does not have a notion of energy cost of a C-states election and current operating systems (OS) choose C-states based on average active time residency or expected sleep duration and the state exit latency.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

The following description describes embodiments of a technique to post weakly ordered transactions. In the following description, numerous specific details such as logic implementations, resource partitioning, or sharing, or duplication implementations, types and interrelationships of system components, and logic partitioning or integration choices are set forth in order to provide a more thorough understanding of the present invention. It will be appreciated, however, by one skilled in the art that the invention may be practiced without such specific details. In other instances, control structures, gate level circuits, and full software instruction sequences have not been shown in detail in order not to obscure the invention. Those of ordinary skill in the art, with the included descriptions, will be able to implement appropriate functionality without undue experimentation.

References in the specification to "one embodiment", "an embodiment", "an example embodiment", indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device).

For example, a machine-readable medium may include read only memory (ROM);

random access memory (RAM); magnetic disk storage media; optical storage media; flash memory devices; electrical, optical, acoustical or other similar signals. Further, firmware, software, routines, and instructions may be described herein as performing certain actions. However, it should be appreciated that such descriptions are merely for convenience and that such actions in fact result from computing devices, processors, controllers, and other devices executing the firmware, software, routines, and instructions.

Although the following embodiments are described with reference to energy conservation and energy efficiency in specific integrated circuits, such as in computing platforms or microprocessors, other embodiments are applicable to other types of integrated circuits and logic devices. Similar techniques and teachings of embodiments described herein may be applied to other types of circuits or semiconductor devices that may also benefit from better energy efficiency and energy conservation. For example, the disclosed embodiments are not limited to desktop and laptop computer systems and may be also used in other devices, such as handheld devices, systems on a chip (SOC), and embedded applications. Some examples of handheld devices include cellular phones, Internet protocol devices, digital cameras, personal digital assistants (PDAs), and handheld PCs. Embedded applications typically include a microcontroller, a digital signal processor (DSP), a system on a chip, network computers (NetPC), set-top boxes, network hubs, wide area network (WAN) switches, or any other system that can perform the functions and operations taught below. Moreover, the apparatus, methods, and systems described herein are not limited to physical computing devices, but may also relate to software optimizations for energy conservation and efficiency. As will become readily apparent in the description below, the embodiments of methods, apparatus, and systems described herein (whether in reference to hardware, firmware, software, or a combination thereof) are vital to a 'green technology' future, such as for power conservation and energy efficiency in products that encompass a large portion of the US or world economy.

A processor forms an important part of a computing system and such processors operate with the operating systems to perform workloads, for example. The operating systems (OS) may monitor sleep states and generate interrupts at regular intervals to wake-up the cores or threads supported by the processor. However, the embodiments described here disclose selection techniques to optimize C-State selection for variable wakeup rates. The measurements on real workloads on current and future tick-less operating systems exhibit a bursty interrupt rate behavior such as 201, which may exhibit (1) bursts of high interrupt rate (for example, 220-1, 220-2, and 220-k of FIG. 2) may be interspersed between low interrupt rate (for example 230-1 of FIG. 2) or long durations with no or zero interrupt rate (for example, 250-1 of FIG. 2). In one embodiment, the idle states (260-0, 260-1, and 260-2) may be interspersed between the long periods of low activity (for example, 210-1 and 210-2 of FIG. 2) and the long periods of low activity 210-1 and 210-2, respectively, service the burst of interrupts 220-1 and 220-2. During the periods of low activity (210-1 and 210-2) OS may select a deep C-state (as shown by sleep state transitions in the region 271-1 and 271-2) in response to completing each interrupt (within the bursts of high interrupt rate 220-1 and 220-2). However, entering the deep C-states and waking up from the deep states frequently to service the interrupts may adversely impact both the performance and the power savings. The performance may be impacted due to increased latency and power savings due to frequency deep state entry and exit flows. Thus, in one embodiment, the demotion flow may be activated such that the demotion counters may be decremented to a point, wherein a shallow C-state is overridden by a demotion logic. Consequently, at the completion of the long period of low activity and while entering the idle periods (260-1 or 260-2), the demotion counter may reflect the state of high interrupt rate (220-1 and 220-2) causing a shallow C-state (such as C1 or C2) to be selected instead of a deeper C-state (such as C6 or C7). Such values in the demotion counter may be stale as the interrupts have been serviced already during the low activity periods (210-1 and 210-2).

Figure 2:
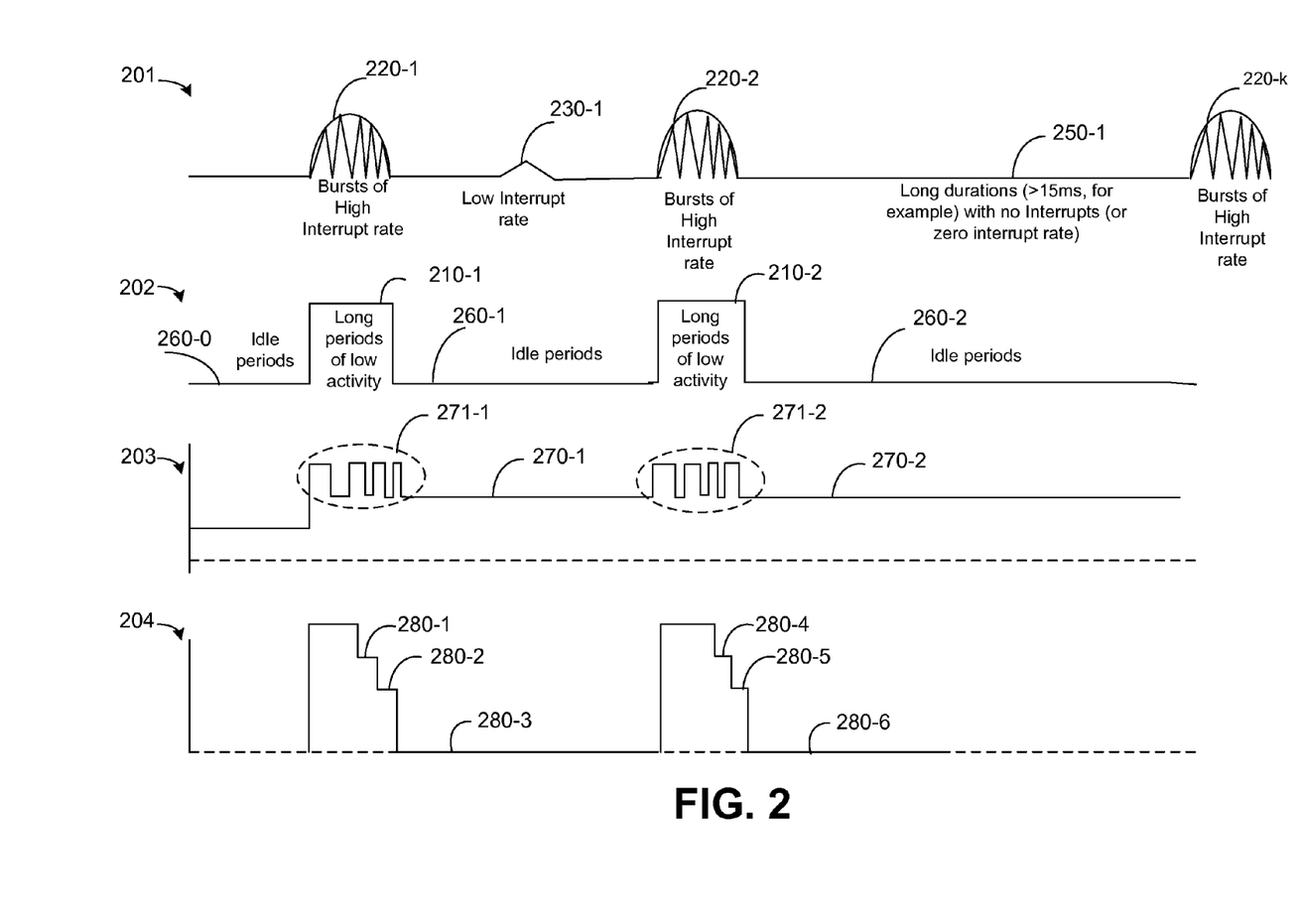
FIG. 2 illustrates a line diagram 200 representing a variable wake-up rate in accordance with one embodiment.

As the bursts of high interrupt rate are interspersed between the low (230-1) or zero interrupt rate (250-1) and the long idle periods (260-1 or 260-2), the processor (in idle state) may still hold the bursts of high interrupt rate as data in its counters. But, the burst of high interrupt rate 220-1 is followed by a low interrupt period (for example, 230-1) and the current techniques make a decision on the power state to which the processing core is to be promoted or demoted based on the data (burst of high interrupt rate 220-1) stored in the counter. Such a decision may push the processing core to a shallower C state (such as C1 depicted by 270-1 of the power saving state line diagram 203, for example) instead of a deeper power saving state (C6 depicted by 280-6 of the line diagram 204, for example). As a result a golden opportunity to save power may be lost. It may be readily seen that the golden opportunity to save power is lost due to reliance on the stale data in the counter. Embodiments described below use C-state selection techniques to select the optimal C-state based on statistics aging and un-demotion approaches. According to the selection techniques described below, the power management block may use C-state limit (CST_lim) and demotion counter values to accelerate the transition (or un-demotion) rate.

Also, as noted above, the interrupt rate may drop (for example, 250-1 of FIG. 2) suddenly far below the one per 15 milliseconds (15 mS) that is typical of current OS. Despite the drop in the interrupt rate (below 15 ms, for example) and the overlapping low activity level (250-1), the current techniques may continue to demote a processing core to a shallower C-state (for example, C2 depicted as 270-2) and then remain in the shallower C-state for a longer period of time. The current techniques may even not detect that the sleep duration is long enough to stop the demotion. As a result, a power saving opportunity is lost.

To overcome the above, in one embodiment, the C-state selection techniques may, pro-actively, perform un-demotion even while the interrupt rate is zero and such un-demotion may occur without waiting for the operating system to interrupt the processor. In one embodiment, the techniques described below may avoid making decisions on the power state based on the stale data. In one embodiment, the approaches described below may dynamically track the CPU or processing core idle residences and the wakeup (or disturbing) events and then dynamically adapt the C-state override to optimally match the expected variable wakeup rate. In one embodiment, the dynamic tracking of processing core idle residences and wakeup events and then dynamically adapting the C-state override to optimally match the expected variable wakeup rate may use statistics-aging and un-demotion techniques. As a result, the approaches described below may override the C-state determined by the operating systems (OS) and may then un-do (or stop) the demotion to dynamically adapt to an optimal C-state to enhance energy efficiency or power consumption opportunity in a processor. In one embodiment, the dynamic adaptation of the C-state transition may be achieved by, proactively, initiating the transaction even while the processing core or the processor is idle or in low power state as depicted by the transitions 280-1 to 280-3 and 280-4 to 280-6 of the line diagram 204). As a result, the processing core may be placed in a deeper C-state (for example, C6 or C7) instead of a shallower C-state (for example, C2 or C3) and the power saving or conservation caused by appropriate selection of the C-state may improve the overall power savings in the processor and the system in which such a processor is used. The average power utilized by the processing core may be saved or conserved without affecting the performance.

Figure 1:
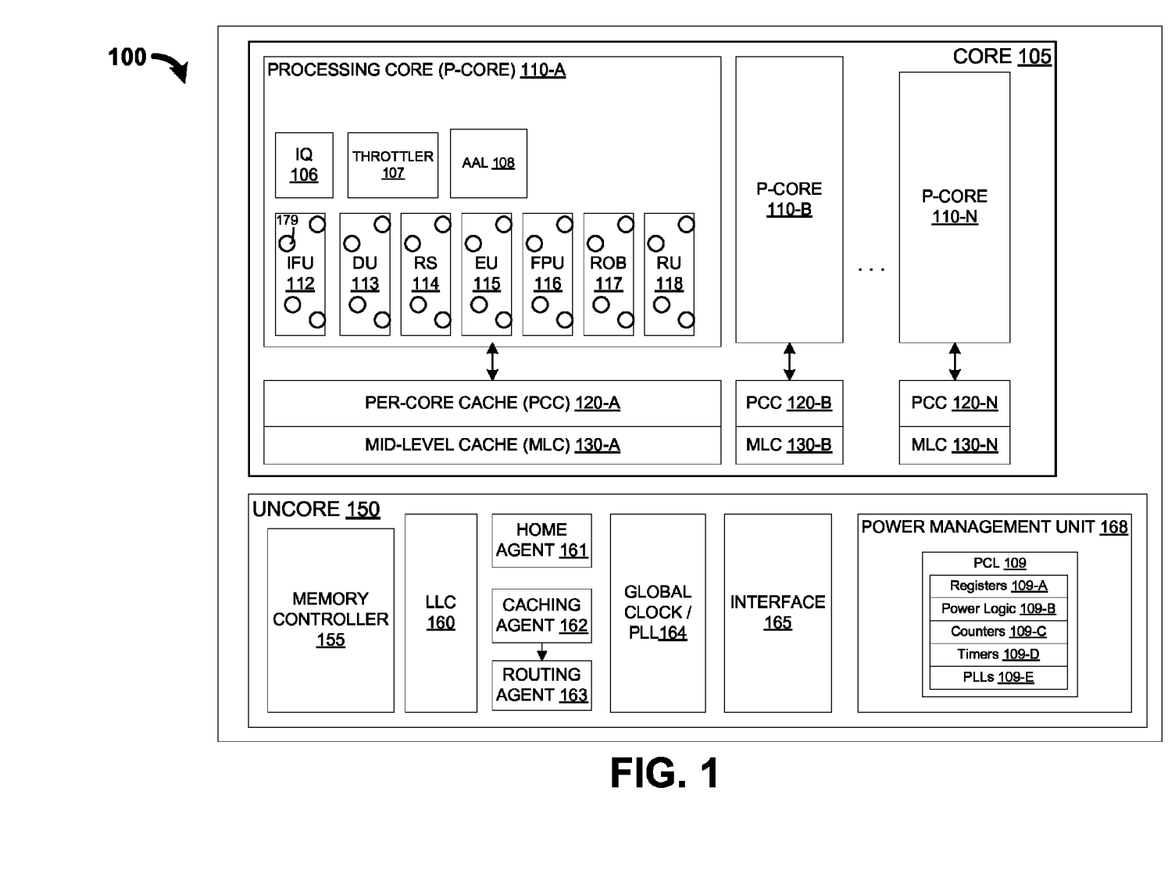
FIG. 1 illustrates a processor 100, which may support a technique to select optimized c-state under variable wakeup rates in accordance with one embodiment.

An embodiment of a processor 100, which may support energy optimal selection of C-states under variable rate wakeup events are illustrated in FIG. 1. In one embodiment, the processor 100 may comprise a core area 105 and an uncore area 150. In one embodiment, the core 105 and the uncore 150 may support a point-to-point bi-directional bus to enhance communication between the processing cores (p-cores) 110 and between the core area 105 and the uncore area 150. In one embodiment, the core area 105 may comprise processing cores such as p-core 110-A to 110-N, per-core caches 120-A to 120-N associated with the p-cores 110-A to 110-N, respectively, and mid-level caches 130-A to 130-N associated with the p-cores 110-A to 110-N, respectively. In one embodiment, the p-cores 110 may include an instruction queue 106, a throttler 107, an activity accumulation logic AAL 108, an instruction fetch unit IFU 112, a decode unit 113, a reservation station RS 114, an execution unit EU 115, a floating point execution unit FPU 116, a re-order buffer ROB 117, and a retirement unit RU 118.

In one embodiment, each processor core 110-B to 110-N may include blocks that are similar to the blocks depicted in the processing core 110-A and the internal details of each of the processing cores 110-B to 110-N is not shown for brevity. In one embodiment, the per-core caches 120 may include memory technologies that may support higher access speeds, which may decrease the latency of instruction and data fetches, for example. In one embodiment, the uncore area 150 may include a memory controller 155, a last level cache LLC 160, a home agent HA 161, a caching agent CA 162, a routing agent RA 163, a global clock/PLL 164, an interface 165, and a power management unit 168.

In one embodiment, the activity sensors 179 may sense the activity occurring within the blocks IFU 112, DU 113, RS 114, EU 115, FPU 116, ROB 117, and RU 118 and provide the activity levels (architectural and data activity values) to the activity accumulation logic. In one embodiment, the activity sensors 179 may be provided in the data paths of each block within the processing core 110-A to enable the activity sensors 179 to detect the architectural and data activity values. In one embodiment, to control the power consumed by the core area 105, the AAL 108 may collect the activity levels sensed by the multiple activity sensors 179 and generate an accumulated activity value. In one embodiment, the activity accumulation logic AAL 108 may provide the accumulated activity value to the PCL 109 provided in the power management unit 168. In other embodiments, the PCL 109 may be provided within each processing core 110.

In one embodiment, the PCL 109 may be implemented in hardware, firmware, or software or a combination thereof. In one embodiment, the PCL 109 may include programmable registers 109-A, power logic 109-B, timers 109-C, counters 109-D, and PLLs 109-E. The contents of the PCL 109 listed here are mere examples and the PCL 109 may include many other hardware, firmware, and software components. In one embodiment, the programmable registers may be configured with values such as a sleep threshold (Slp_threshold) value for each C-state [C(n)], demotion-delta value, long-duration delta value, demotion threshold (dem_threshold) value, aging time out value (aging_timeout), aging delta (aging_delta) value, un-demotion time out value (un-demotion_timeout), un-demotion_delta value, and C-State limit value (CST_lim).

In one embodiment, the power logic 109-B may use the threshold, delta, and timeout values and the actual sleep duration of the processing core in each C-state to, dynamically, determine the optimal C-state in response to wakeup events occurring at a variable (or non-uniform) rate. In one embodiment, the PCL 109 may control the one or more of voltage, frequency, instruction rate, and such other parameters based on the optimum C-state that may be determined dynamically by the PCL 109. In one embodiment, the PCL 109 may use the throttler 107 to change the power control parameters to suit the optimal C-state.

An embodiment of a representation of the interrupt rate behavior of an operating system measured on real workloads is illustrated in FIG. 2. In one embodiment, the line diagram 201 may represent the interrupt rate behavior as measured by the OS on real workloads, the line diagram 202 may represent the activity state of the processing cores, the line diagram 203 may represent the power saving state transition diagram in the absence of the power saving state selection techniques described below, and the line diagram 204 may depict the power saving state transition diagram in response to using the power saving state selection techniques described below.

In one embodiment, the measurement of real workloads on the OSes (as depicted by the line diagram 201) exhibit two important characteristics—(1) the bursts of high interrupt rate (220-1 and 220-2) are interspersed between the low interrupt rate periods (230-1); and (2) the interrupt rate (represented by the period 250-1) may, suddenly, fall below an interrupt rate (15 mS) that is typical of the current operating systems (OS).

As may be readily observed, the long periods of low activity 210-1 and 210-2 may, respectively, at least partially, overlap with the burst of high interrupt rates 220-1 and 220-2. But, the registers 109-A may store the values based on the occurrences (such as high interrupt rate period 220-1 and 220-2, for example) in a specific past duration (history). Based on the history of the data stored in the registers of 109-A, the CPU may, in absence of the techniques described below, determine a shallower C-state (such as C1 or C2 as depicted by 270-1 or 270-2 of the line diagram 203, for example) as an appropriate C-state for the processing core 110-A. However, on observation of the events closely, the long period of low activity 210-1 has occurred in response to the bursts of high interrupt rate 220-1 and the bursts of high interrupt rate 220-1 have already been serviced by the low activity 210-1. As a result, the values in the registers 109-A may be old (or stale) and may not be relevant to determine the C-state.

Further, the low interrupt rate period 230-1 follows the bursts of high interrupt rate 220-1 and there may exist a golden power saving opportunity by choosing a deeper C-state (such as C6, for example). In one embodiment, the techniques described below allow such golden power saving opportunities to be utilized effectively by stopping the demotion of the processing core 110-A into a shallower C-state such as C1 or C2 or C3. In the place of demotion, the power management unit may perform un-demotion (or increase the transition rate, even while the CPU is in a low activity state, to quickly un-demote the CPU to a deeper C-state such as C6 or C7. Further, the techniques described below may enable the PCL 109 to override the C-state determined by the OS and may, dynamically, demote and un-demote the CPU to an optimal C-state to take advantage of the power saving opportunities occurring due to variable wakeup event rate.

Figure 3:
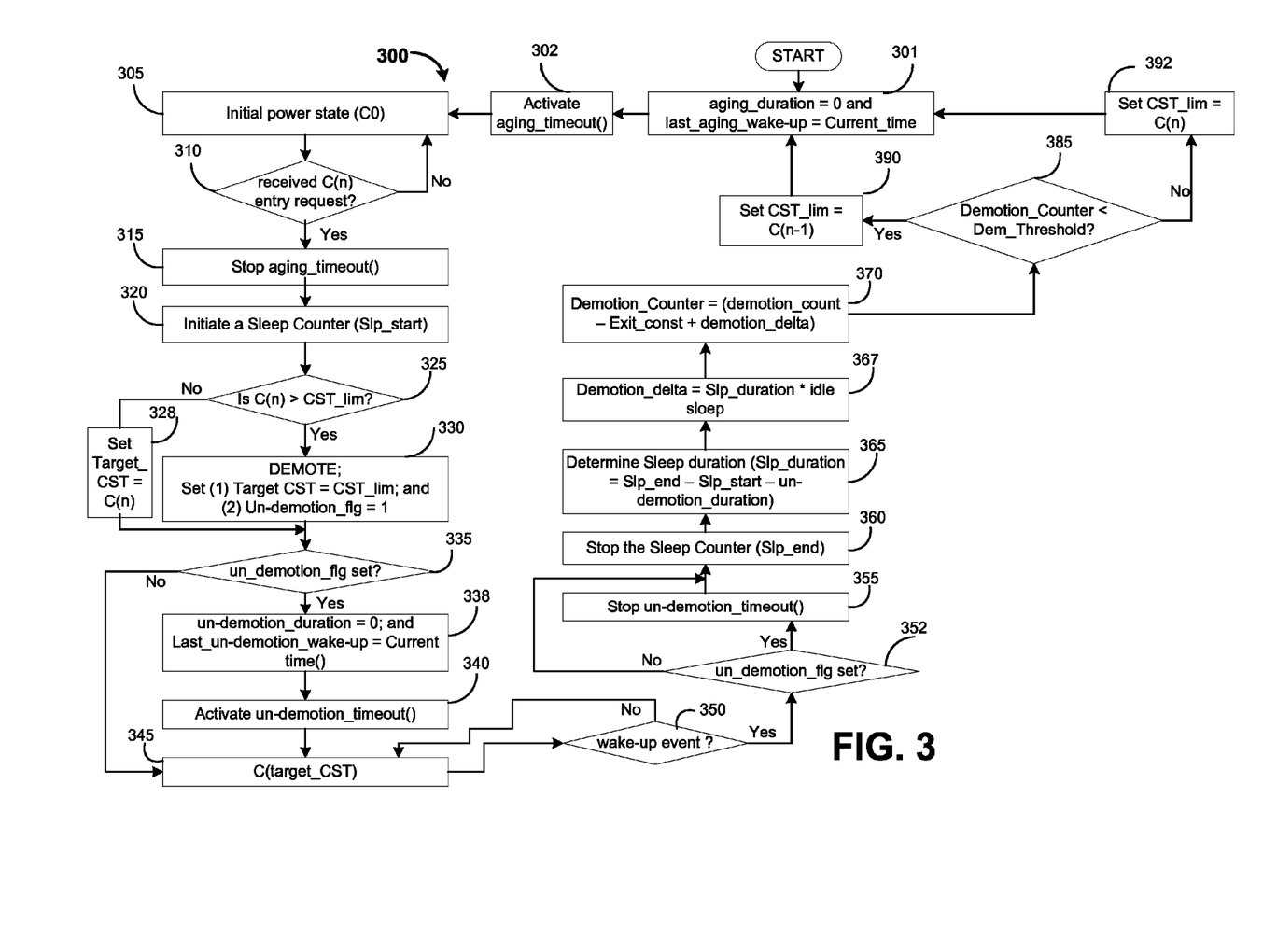
FIG. 3 illustrates a flow-chart 300 according to which the processor 100 may optimize the C-State selection under variable wakeup rates in accordance with one embodiment.

A flow-chart illustrating the operation of the processor 100, which may optimize the C-State selection under variable wakeup rates in illustrated in FIG. 3. In block 301, the aging_duration may be initialized to zero and the last_aging_wakeup may be initialized to Current_time value. In block 302, the PCL 109 may activate the ageing_timeout( ) function. In block 305, the processing core 110-A may be in active or initial power state or C0 state. In block 310, the PCL 109 may check whether the first power state for example, C(n)) entry request is received and control may pass to block 315 in response to receiving the request and may pass to block 305 if the C(n) state entry request is not received. In one embodiment, the C(n) entry request may be generated by the operating system (OS) or the firmware in the power management unit 168 or any other such block, which may perform power management function. In one embodiment, the OS may generate a request based on the activity levels, residency times in each power saving state and such other heuristics. However, the OS may generate such requests based on historic data and transitioning from one power saving state to other based only the requests generated by the OS may not be effective, for example, due to the stale data of the target C-state or the slow transition rate into or from the target C-state from one power state to the other. In one embodiment, the demotion technique described below may over-ride the request sent by the OS and push the processor (or the cores) into a shallower power saving state and the un-demotion technique may set the status of the registers such that the previous demotion operation may be terminated and power state requested by the OS may be achieved by the hardware (or the PCL 109). In one embodiment, the override techniques may use the un-demotion and statistical aging approaches described below.

In one embodiment, the first power state [C(n)] state may be determined based on the stale data in the registers 109-A. As a result, the PCL 109 may perform optimal C-state determination or selection techniques to determine if C(n) is an optimal C-state and if C(n) is not an optimal C-state, the PCL 109 may determine an optimal C-state, which may other than the C(n) state determined by the OS or other power management block.

In block 315, the PCL 109 may stop the aging_timeout( ) In block 320, the PCL 109 may initiate a sleep counter with a Slp_start value. In one embodiment, the PCL 109 may use one of the counter 109-C as a sleep counter. In block 325, the PCL 109 may determine if C(n) is greater than CST_lim (C-state limit) and control passes to block 328 if the C(n) is less than CST_lim and to block 330 if the C(n) is greater than the CST_lim. In one embodiment, the CST_lim may be used to enforce the demotion. For example, there may be three power saving states C1, C3, and C6 and each power saving state may be associated with a demotion finite state machine (FSM). In one embodiment, the C6 demotion FSM may determine that a demotion is due then if the C3 demotion FSM determines that a demotion from C3 is not required the CST_lim may be set to C3 and if the C3 demotion FSM determines that demotion from C3 is required then the CST_lim may be set to C1. In one embodiment, the CST_lim may represent a deepest C-state, which the processing core 110-A may be allowed to reach due to the demotion process. In one embodiment, the CST_lim may determine whether the demotion is in effect and to the extent (the state) the demotion is allowed.

In block 328, the PCL 109 may set the target CST to C(n). In one embodiment, the target CST may equal a minimum of a first C-state provided by the OS included in the C-state entry request. In one embodiment, as the target CST is equal to (C(n)) there may be no demotion or the requested C-state (C(n)) may be shallower than CST_lim set by the power management block (or the hardware). In block 330, the PCL 109 may set the target CST to CST_lim and un_demotion_flg to logic one. In one embodiment, the demotion may occur as the target CST may be set to CST_lim based on the demotion technique used and the target CST (i.e., CST_lim) in this case may be not be the same as the request sent by the OS. In block 335, the PCL 109 may check if the un_demotion_flg is set and control passes to block 338 if the un_demotion_flg is set (=1) and to block 345 otherwise.

In block 338, the PCL 109 may initialize a demotion counter and set the un-demotion_duration to 0 and the PCL 109 may also set a last_un-demotion_wake-up variable to the Current_time. In one embodiment, the demotion_duration may be set to zero to erase the stale data stored in the variable demotion_duration. In one embodiment, the PCL 109 may reset the demotion counter to erase the high interrupts data, which have occurred outside a window period. In one embodiment, the PCL 109 may thus allow the demotion counter to remember the interrupts (or the sleep duration) within a small window. Such an approach may enhance the responsiveness or increase the rate of transition between one or more power saving states. In block 340, the PCL 109 may activate un-demotion_timeout( ) function and in block 345, the C-state may be set to target C-state. In block 350, the PCL 109 may determine whether a wake-up event has occurred and control passes to block 352 in response to occurrence of the wake-up event and to block 345 otherwise. In block 352, the PCL 109 may check whether the un-demotion flag (un-demotion_flg) is set and control passes to block 355 if the un-demotion_flg is set and to block 360 otherwise.

In block 355, the PCL 109 may stop the un-demotion_timeout( ) function and in block 360, the PCL 109 may stop the sleep counter, which was initiated in block 320. Also, the count (Slp_end value) registered on the sleep counter may be stored and used to compute the actual sleep duration of the processing core 110-A.

In block 365, the PCL 109 may determine the sleep duration using the Slp_start and Slp_end values. In one embodiment, the sleep duration may equal (Slp_end-Slp_start-un_demotion_duration). In one embodiment, the selection techniques described here may allow the PMU 168 to proactively check the sleep duration and if the sleep duration exceeds a specific level (demotion threshold), the CPU or the processor 100 or the processing cores 110 may be un-demoted or transitioned to a deeper power saving state to save energy. In one embodiment, such un-demotion (or transition to a deeper power saving state) may occur without requiring an interrupt from the OS. In block 367, the PCL 109 may determine the demotion_delta value based on the sleep duration. In one embodiment, the demotion_delta may equal slp_duration*idle slope. In one embodiment, the idle slope may represent a linear constant, which may be defined as an amount of increment in the demotion counter over a specified time period. In block 370, the PCL 109 may set the demotion_counter to a value equal to (demotion_count−Exit_Const+demotion_delta). In one embodiment, the demotion_count may equal a value registered by a counter while the un-demotion timeout( ) is stopped (in block 355). In one embodiment, the demotion_count measured between the time point at which the demotion_count is cleared (in block 338) and the demotion_timeout( ) (as in block 355) and the demotion count may be small and the transition between the power saving states may be performed based on the demotion_count. As a result, the transition rate may increase and the PCL 109 may cause the CPU to enter a desirable (or optimum) power saving state quickly and the C-state selected by the OS may be over-ridden by the PCL 109. In one embodiment, the Exit_Const may represent a value, which may be used to decrement the demotion counter while exiting the C-state each time. In one embodiment, the demotion_delta may represent a value used to update the demotion counter based on whether the sleep duration is long enough. In one embodiment, the demotion_delta value may represent a rate at which the demotion counter is incremented or decremented. In one embodiment, the demotion_delta may be determined either statistically or based on the user preference as indicated by the OS.

In block 385, the PCL 109 may determine if the value in the demotion_counter is less than the demotion threshold (dem_threshold) and control passes to block 390 if the value in the demotion_counter is less than the demotion threshold (dem_threshold) and to block 392 otherwise. In one embodiment, the demotion threshold (dem_threshold) may represent a reference point, which may be set for the demotion counter below which demotion to the next shallower state may be performed.

In block 390, the PCL 109 may set the CST_lim to C(n-1). In block 392, the PCL 109 may set the CST_lim to C(n) and control passes to block 302 in which the aging_timeout( ) function is activated. To overcome the inadequacy of the OS to, quickly, respond to the change in the interrupt rate, the selection techniques may over-ride the C-state decision made by the OS and may either demote or un-demote the CPU or the processor 100 into an optimum power saving state. In one embodiment, the optimum power state determined by the selection techniques (using CST_lim, for example) described above allow transitions from one power saving state to the other at a higher rate as compared to the transition rate supported by the OS. In one embodiment, the undemotion technique described above may perform the power saving state transitions even without receiving any interrupts from the OS. In one embodiment, the over-ride may be removed progressively if the C-state provided by the OS itself is an optimum power saving state. In one embodiment, the demotion may be switched off, for example, using the C-state exit flow in which the demotion counter may be updated or in response to the expiration of the un-demotion timer or the aging timer. In one embodiment, the selection techniques described here may allow the PMU 168 to proactively check the sleep duration and if the sleep duration exceeds a specific level, the CPU or the processor 100 or the processing cores 110 may be un-demoted and transitioned to a deeper power saving state to save energy. In one embodiment, such un-demotion and transition to a deeper power saving state may occur without requiring an interrupt from the OS.

Figure 4:
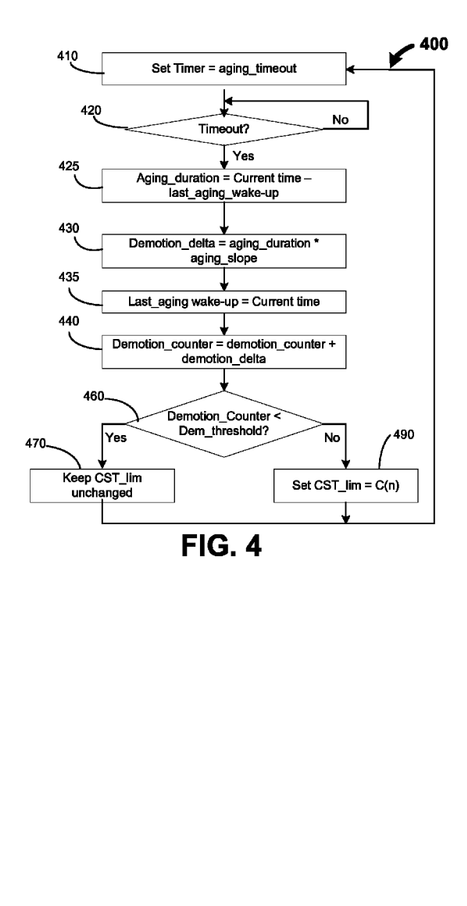
FIG. 4 is a flow-chart 400, which illustrates technique to determine a statistics aging value in accordance with one embodiment.

An embodiment of a statistics-aging technique 400 is illustrated in the flowchart of FIG. 4. In block 410, the PCL 109 may set an aging timer, such as one of the timers 190-E, to a value, which is less than or equal to the aging_timeout value. In one embodiment, the aging_timeout value may be stored in one of the registers 109-A. In one embodiment, the aging_timeout value may be configured by a user or the PCL 109 may determine it dynamically and configure the register periodically. In block 420, the PCL 109 may check if the timeout is reached and control passes to block 425 if the timeout is reached and loops back otherwise.

In block 425, the PCL 109 may set the aging_duration to a value equal to the difference between the last_aging_wake-up and the Current time. In one embodiment, the aging_duration may equal (Current time−last_aging_wake-up). In block 430, the PCL 109 may determine the demotion_delta based on the aging_duration. In one embodiment, the demotion_delta may equal aging_duration*aging_slope. In one embodiment, the aging duration may equal (current time−last aging wake-up), wherein the current time represents the time at an instant in which the PCL 109 may determine the demotion_delta and the last aging wake-up represents the time point at which the immediate previous wake-up event occurred. In one embodiment, the last_aging_wake-up may be initiated with the Current time in the block 301 of FIG. 3 while the CPU enters the C0 state. In one embodiment, the aging_slope may represent a constant, which may define the amount of increment of the demotion counter over a specified time period while the processor is in C0 state. In block 435, the PCL 109 may set the last_aging_wake-up to the Current time. In block 440, the PCL 109 may set the demotion counter to (demotion_counter+demotion_delta) or in other words the PCL 109 may increment the demotion counter by a value equaling demotion_delta. In one embodiment, the demotion_delta may represent the rate at which the demotion information may decay or the high interrupt period may be slowly forgotten over time. In one embodiment, the demotion counter may be incremented at "aging_timeout" intervals.

In block 460, the PCL 109 may check if the demotion_counter value is less than a demotion threshold (dem_threshold) value and control passes to block 470 if the demotion_counter value is less than the demotion threshold (dem_threshold) value and to block 490 if the demotion_counter value is greater than the demotion threshold (dem_threshold) value. In block 470, the PCL 190 may not change the CST_lim and in block 490, the PCL 190 may set the CST_lim to C(n).

Figure 5:
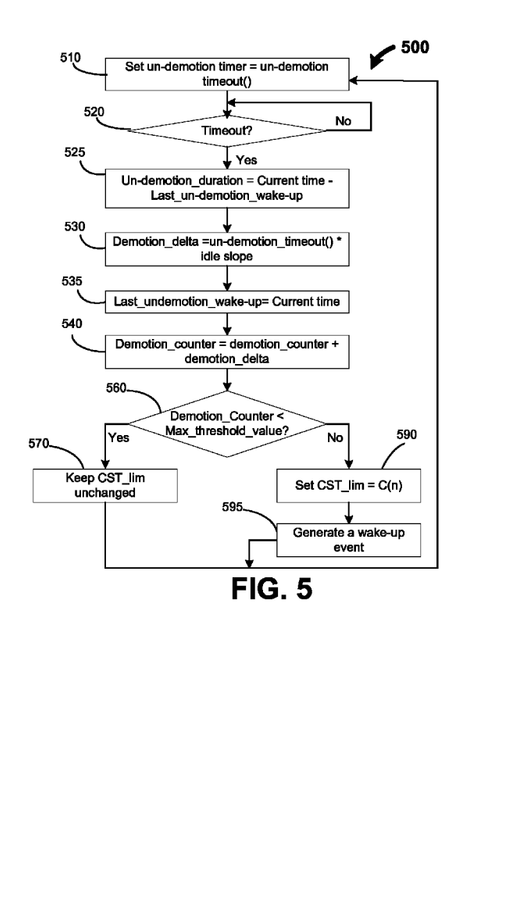
FIG. 5 is a flow-chart 500, which illustrates technique not to demote (un-demote) the processor to a shallower C-state in accordance with one embodiment.

An embodiment of an undemotion technique 500 is illustrated in the flowchart of FIG. 5.

In block 510, the PCL 109 may set the un-demotion timer to an un-demotion timeout( ) value. In block 520, the PCL 109 may check if the timeout is reached and control passes to block 525 if the timeout is reached and loops back otherwise. In block 525, the PCL 109 may set the un-demotion_duration to a value based on the Last_un-demotion_wake-up and the Current time. In one embodiment, the un-demotion_duration may equal (Current time−Last_un-demotion_wake-up).

In block 530, the PCL 109 may set the demotion_delta based on the un-demotion duration. In one embodiment, the demotion_delta may equal (un-demotion_duration*idle_slope). In one embodiment, the un-demotion duration may equal (Current time−last un-demotion wake-up), wherein the Current_time may represent the time at an instant in which the PCL 109 may determine the demotion_delta and the last un-demotion wake-up may represent the time point at which the immediate previous wake-up event occurred. In one embodiment, the PCL 109 may initiate last un-demotion wake-up with the Current time in the block 338 while the CPU enters into a demotion C-state. In one embodiment, the idle slope may represent a constant, which may be defined as an amount of by which the demotion counter may be incremented over a specific period of time. In block 535, the PCL 109 may set the Last_un-demotion_wake-up equal to Current time. In block 540, the PCL 109 may set the demotion counter to (demotion_counter+demotion_delta) or in other words the PCL 109 may increment the demotion counter based on the un-demotion_delta. In one embodiment, the un-demotion_delta may represent a decay rate for the demotion counter based on uninterrupted idle durations.

In block 560, the PCL 109 may check if the demotion_counter value is less than a maximum threshold value (Max_threshold_value) and control passes to block 570 if the demotion counter value is less than the maximum threshold value (Max_threshold_value) and to block 590 if the demotion_counter value is greater than the maximum threshold value (Max_threshold_value). In one embodiment, the action taken based on a comparison between the demotion_counter value and the maximum threshold value may support un-demotion even after the PCL 109 determines that the current condition of the processor is stable. Such an approach may avoid hysteresis, which may unnecessarily cause demotions and un-demotions. In block 570, the PCL 190 may not change the CST_lim value and in block 590, the PCL 190 may set the CST_lim to C(n). In block 595, the PCL 109 may generate a wake-up event.

Figure 6:
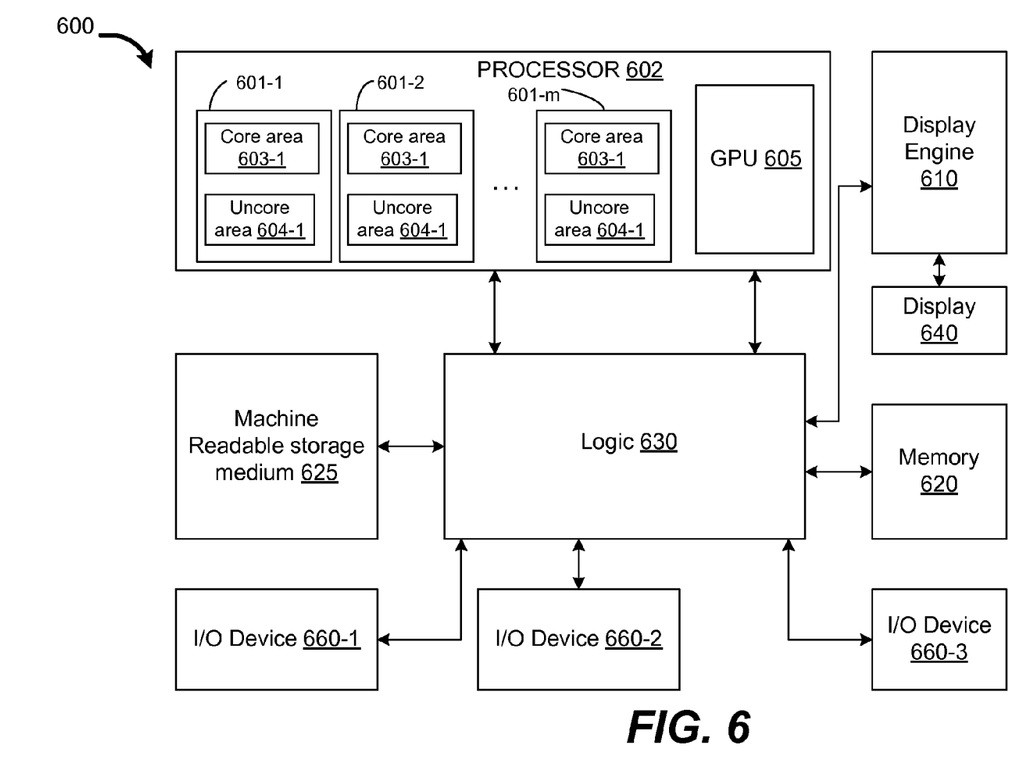
FIG. 6 illustrates a computer system 600, which may support a technique to select optimized c-state under variable wakeup rates in accordance with one embodiment.

Referring to FIG. 6, a computer system 600 may include a general purpose processor 602 including a single instruction multiple data (SIMD) processor, multiple processing cores 60-1 to 601-*m*, and a graphics processor unit (GPU) 605. The processor 602, in one embodiment, may perform enhancement operations in addition to performing various other tasks or store a sequence of instructions, to provide enhancement operations in a machine readable storage medium 625. However, the sequence of instructions may also be stored in the memory 620 or in any other suitable storage medium.

While the graphics processor unit 605 is depicted as integrated within the processor 602 in FIG. 12, in some embodiments, the graphics processor unit 605 may be provided separately outside the processor 602 and may be used to perform enhancement operations, as another example. The processor 602 that operates the computer system 600 may be one or more processor cores coupled to logic 630. The logic 630 may be coupled to one or more I/O devices 660, which may provide interface the computer system 600. The logic 630, for example, could be chipset logic in one embodiment. The logic 630 is coupled to the memory 620, which can be any kind of storage, including optical, magnetic, or semiconductor storage. The graphics processor unit 605 is coupled through a frame buffer to a display 640.

In one embodiment, the processor 602 may include multiple processing cores 601-1 to 601-*m* and each of which may include a core area 603 and an uncore area 604. In one embodiment, the power consumed by the core area 603 of the processor 602 may be dynamically determining an optimal C-state while the wakeup events occur in non-uniform or variable pattern. In one embodiment, the power control logic provided in the core area 603 may override the C-state determined by the OS or any other power monitoring logic. In one embodiment, the power control logic may, dynamically, determine an optimal C-state based on the CPU idle residency times and variable rate wakeup events to match the expected wakeup event rate as described above.

Certain features of the invention have been described with reference to example embodiments. However, the description is not intended to be construed in a limiting sense. Various modifications of the example embodiments, as well as other embodiments of the invention, which are apparent to persons skilled in the art to which the invention pertains are deemed to lie within the spirit and scope of the invention.

What is claimed is:

1. A processor comprising:
   a plurality of processing cores;
   at least one cache memory; and
   a power management unit to receive a first request from an operating system for entry into a first power saving state into which the processor is to be placed, demote the processor to a second power saving state, which is a lesser power saving state than the first power saving state if a low activity period of the processor overlaps with a burst of high interrupt rate, and un-demote the processor to a third power saving state, which is a greater power saving state than the first power saving state in response to a determination that an interrupt rate is low, without receipt of an interrupt from the operating system.

2. The processor of claim 1, wherein the power management unit is to un-demote the processor to a fourth power saving state, which is a greater power saving state than the third power saving state if a sleep duration of the processor in the third power saving state exceeds a demotion threshold.

3. The processor of claim 2, wherein the power management unit is to track the sleep duration of the processor in the third power saving state, and increase a rate of transition from one power saving state to the greater power saving state during a low interrupt period.

4. The processor of claim 3, wherein the power management unit is to increase the rate of transition from the one power saving state to the greater power saving state during a zero interrupt period.

5. The processor of claim 4, wherein the power management unit is to increase the rate of transition from the one power saving state to the lesser power saving state in response to an occurrence of high interrupt rate.

6. The processor of claim 5, wherein the power management unit further comprises a demotion counter to track the sleep duration, the power management unit to demote the processor to the lesser power saving state if the sleep duration of the processor in the second power saving state is less than the demotion threshold.

7. The processor of claim 6, wherein the power management unit is to:
   increment the demotion counter by a demotion delta value, wherein the demotion delta value represents a rate at which the demotion counter is to be incremented or decremented; and
   reset the demotion counter to erase interrupts that occurred outside a window period.

8. A non-transitory machine-readable medium having stored thereon instructions, which if performed by a machine cause the machine to perform a method comprising:
   receiving a request from an operating system for entry of a processor into a first power saving state;
   demoting the processor to a second power saving state, which is a lesser power saving state than the first power saving state if a low activity period of the processor overlaps with a burst of high interrupt rate; and
   un-demoting the processor to a third power saving state, which is a greater power saving state than the first power saving state in response to determining that an interrupt rate is low, without receipt of an interrupt from the operating system.

9. The non-transitory machine-readable medium of claim 8, wherein the method further comprises un-demoting the processor to a fourth power saving state, which is a greater power saving state than the third power saving state if a sleep duration of the processor in the third power saving state exceeds a demotion threshold.

10. The non-transitory machine-readable medium of claim 9, wherein the method further comprises:
   tracking the sleep duration of the processor in the third power saving state; and
   increasing a rate of transition from one power saving state to a greater power saving state during a low interrupt period.

11. The non-transitory machine-readable medium of claim 10, wherein the method further comprises increasing the rate of transition between the one power saving state and the greater power saving state during a zero interrupt period.

12. The non-transitory machine-readable medium of claim 11, wherein the method further comprises increasing the rate of transition between the one power saving state and the lesser power saving state in response to an occurrence of high interrupt rate.

13. The non-transitory machine-readable medium of claim 12, wherein the method further comprises demoting the processor to the lesser power saving state if a sleep duration of the processor in the second power saving state is less than the demotion threshold.

14. The non-transitory machine-readable medium of claim 13, wherein the method further comprises:
   incrementing a demotion counter by a demotion delta value, wherein the demotion delta value represents a rate at which the demotion counter is incremented or decremented; and
   resetting the demotion counter to erase interrupts that occurred outside a window period.

15. A computer system comprising:
   a plurality of input-output devices;
   a display device; and
   a processor including:
      a plurality of processing cores, at least one cache memory, and a power management unit to receive a first request from an operating system for entry into a first power saving state into which the processor is to be placed, demote the processor to a second power saving state, which is a lesser power saving state than the first power saving state if a low activity period of the processor overlaps with a burst of high interrupt rate, and un-demote the processor to a third power saving state, which is a greater power saving state than the first power saving state in response to a determination that an interrupt rate is low, without receipt of an interrupt from the operating system.

16. The computer system of claim 15, wherein the power management unit is to un-demote the processor to a fourth power saving state, which is a greater power saving state than the third power saving state if a sleep duration of the processor in the third power saving state exceeds a demotion threshold.

17. The computer system of claim 16, wherein the power management unit is to track the sleep duration of the processor in the third power saving state, and increase a rate of transition from one power saving state to a greater power saving state during a low interrupt period.

18. The computer system of claim 17, wherein the power management unit is to increase the rate of transition from the one power saving state to the greater power saving state during a zero interrupt period.

19. The computer system of claim 18, wherein the power management unit is to increase the rate of transition from the one power saving state to the lesser power saving state in response to an occurrence of high interrupt rate.

20. The computer system of claim 19, wherein the power management unit further comprises a demotion counter to track the sleep duration, the power management unit to:
   demote the processor to the lesser power saving state if the sleep duration of the processor in the second power saving state is less than the demotion threshold;
   increment the demotion counter by a demotion delta value, wherein the demotion delta value represents a rate at which the demotion counter is incremented or decremented; and
   reset the demotion counter to erase interrupts that occurred outside a window period.

* * * * *